United States Patent
Hellerstein et al.

(10) Patent No.: US 7,013,461 B2
(45) Date of Patent: Mar. 14, 2006

(54) SYSTEMS AND METHODS FOR SERVICE AND ROLE-BASED SOFTWARE DISTRIBUTION

(75) Inventors: Joseph L. Hellerstein, Ossining, NY (US); Gautam Kar, Yorktown Heights, NY (US); Alexander Keller, Mamaroneck, NY (US)

(73) Assignee: International Business Machines Corporation, Armonk, NY (US)

( * ) Notice: Subject to any disclaimer, the term of this patent is extended or adjusted under 35 U.S.C. 154(b) by 760 days.

(21) Appl. No.: 09/755,786

(22) Filed: Jan. 5, 2001

(65) Prior Publication Data

US 2002/0129356 A1  Sep. 12, 2002

(51) Int. Cl.
G06F 9/445 (2006.01)
G06F 9/44 (2006.01)
G06F 15/173 (2006.01)
G06F 15/177 (2006.01)

(52) U.S. Cl. ............. 717/177; 717/172; 709/223; 709/221

(58) Field of Classification Search ........ 395/703, 395/500.43, 712; 717/11, 167, 166, 109, 717/4, 168–178; 711/170; 709/223–224, 709/221; 713/200
See application file for complete search history.

(56) References Cited

U.S. PATENT DOCUMENTS

| | | | |
|---|---|---|---|
| 5,581,764 A * | 12/1996 | Fitzgerald et al. | 709/223 |
| 5,953,533 A | 9/1999 | Fink et al. | 717/175 |
| 5,960,169 A * | 9/1999 | Stupek et al. | 717/169 |
| 5,999,740 A | 12/1999 | Rowley | 717/173 |
| 6,199,204 B1 * | 3/2001 | Donohue | 717/178 |
| 6,484,247 B1 * | 11/2002 | Gendron et al. | 711/170 |
| 2002/0133814 A1 * | 9/2002 | Bourke-Dunphy et al. | |
| 2002/0144248 A1 * | 10/2002 | Forbes et al. | |

FOREIGN PATENT DOCUMENTS

GB   2 333 864 A   8/1999

OTHER PUBLICATIONS

IBM "New Features in Tivoli Software Distribution 3.6" by Uelpenich, published on 1998, see http://www.redbooks.com*
Keller-Blumenthal-Kar, Classification and Computation of Dependencies for Distributed Management, Jul. 2000, IEEE.*

* cited by examiner

Primary Examiner—Antony Nguyen-Ba
(74) Attorney, Agent, or Firm—Ryan, Mason & Lewis, LLP (57) ABSTRACT

Computer-based methods and systems for performing automated distribution of a software package to one or more target machines in one or more regions of a distributed network of target machines, comprises the following steps. First, a base software package is prepared for each of the one or more regions based on at least one of: (i) policy data indicating which of the one or more regions are candidates for receiving the software package, (ii) dependency information indicating requisites for a service provided by the software package, and (iii) configuration information for each of the candidate regions. The base software package is then distributed to each of the candidate regions of the distributed network. The base software package received at each of the candidate regions is then customized based on at least one of: (i) regional distribution policies, (ii) dependency information specific to one or more roles performed by the target machines in that region, and (iii) individual target machine configuration information. Lastly, the software package customized in each of the candidate regions is distributed to at least one of the target machines in the candidate regions of the distributed network.

20 Claims, 9 Drawing Sheets

SYSTEMS AND METHODS FOR SERVICE AND ROLE-BASED SOFTWARE DISTRIBUTION

FIELD OF THE INVENTION

The present invention relates to distributed computing systems and, more particularly, to systems and methods for performing software distribution in such distributed computing systems.

BACKGROUND OF THE INVENTION

Software distribution adds significantly to the total cost of ownership associated with a distributed system due to the need to: (i) identify computing devices or machines ("targets") that need to be updated with a specific software package from an enterprise perspective; (ii) make sure that targets have the right services and components present (e.g., operating system, services and applications), and that these services have the right versions; and (iii) make sure that targets have the prerequisite set of resources (e.g., CPU (central processing unit) type and clock speed, memory, disk storage, paging space, etc.), in order to be able to receive and run the new software item.

Most existing software distribution mechanisms store information about target machine configuration and requirements in a central database and require the involvement of human operators, thus making the procedure inefficient, unscalable, costly, and error-prone. They often rely on the target machine user to select the software packages ("pull-based approach") that should be distributed and installed, see, e.g., U.S. Pat. No. 5,953,533 issued to Fink et al. on Sep. 14, 1999 and entitled "Computer Software Distribution, Installation and Maintenance Method and Apparatus;" and U.S. Pat. No. 5,999,740 issued to Rowley on Dec. 7, 1999 and entitled "Updating Mechanism for Software."

Existing approaches for "push-based" software distribution usually require the manual selection of potential distribution targets by a software distribution administrator and, therefore, put the burden of decision making on a human operator, leading basically to the same problems as the pull-based approach described above.

Figure 1:
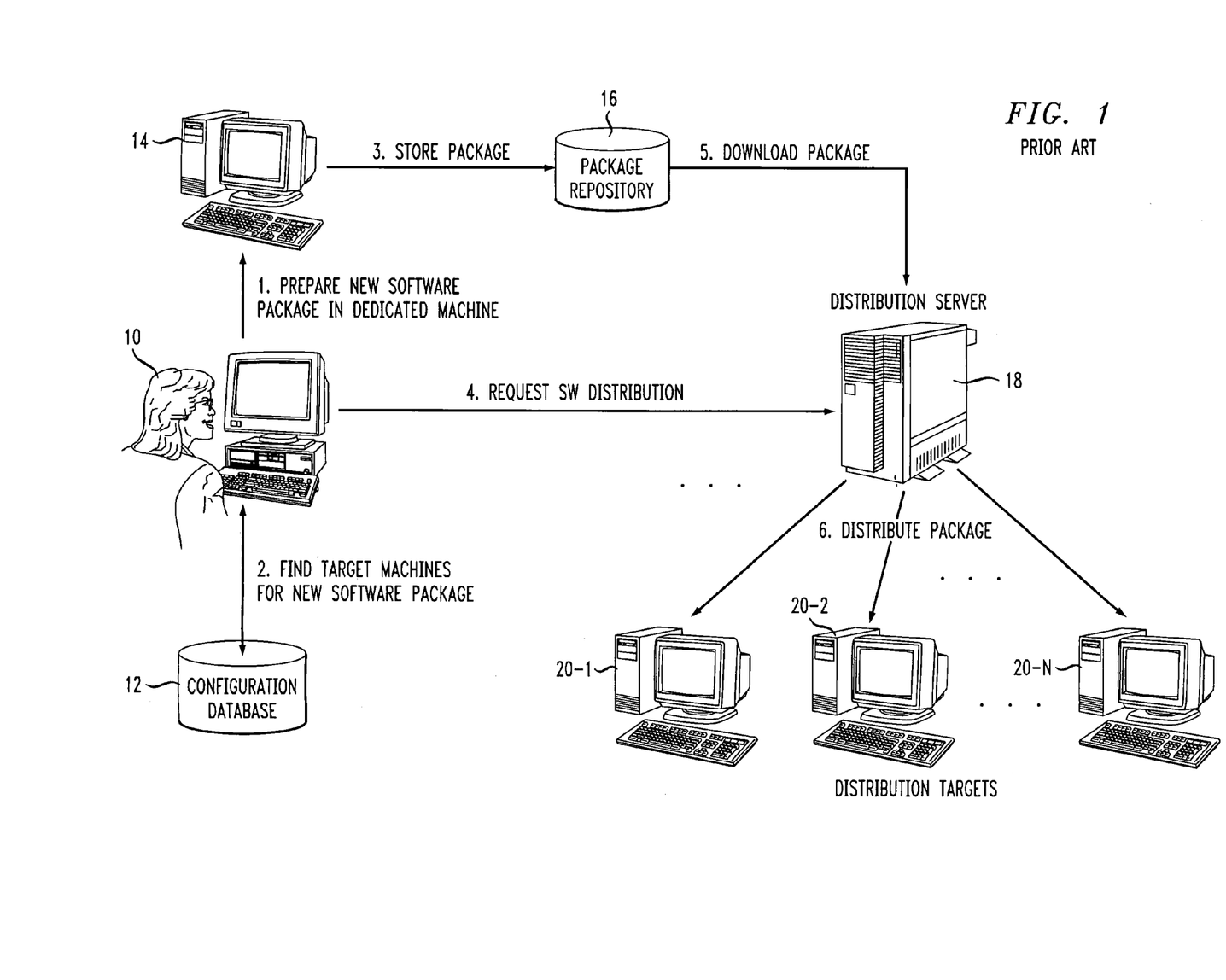
FIG. 1 is a block diagram illustrating a preparation and distribution procedure implemented in a typical conventional software distribution system.

FIG. 1 illustrates the procedure implemented in a typical conventional software distribution system. In step 1, an administrator 10 prepares a new software item to be distributed to a set of desktop machines. This is preferably done in a machine 14 dedicated to building software packages which contains the requisite operating system components for doing so. In step 2, a configuration file or database 12 is consulted to determine which target machines should receive the new software. This configuration file is typically updated and maintained by a group of administrators, requiring considerable human interaction and thus is often out of sync with the real states of the target machines. In step 3, the new software package is stored in a package repository 16. In step 4, there is a request for distribution of the software package from the administrator 10 to a distribution computer system or server 18. In step 5, the package is downloaded to the distribution server 18. Lastly, in step 6, the package is distributed by the distribution server 18 to the distribution target computer systems 20-1, 20-2, . . . , 20-N.

SUMMARY OF THE INVENTION

The present invention provides systems and methods for performing automated software distribution in distributed computing systems. The invention addresses the problem of software distribution from the viewpoint of service provisioning. In this context, by services, we mean typical applications, such as web browsing service, word processing service, computer virus checking service, etc.

A main reason that software installation and upgrades are done in an enterprise IT (information technology) environment is to ensure that end users have access to, and can use, the services of their choice using their computing environment. Thus, when a new service associated with a software package is introduced or an existing one is upgraded, an important task is to efficiently identify the target machines that require a new software package to be installed. The invention provides a novel methodology to perform this activity. The invention focuses on the role that target machines play in the operation of a distributed system. The invention takes into account whether a target uses specific services ("client") or provides services ("server"). Examples of service providing machines are a "name server" and "DHCP servers." Examples of service using machines are a "database client" and a "web client." A target can play several roles at the same time, e.g., a target having the role of a "web server" requires for its functioning a name service and thus acts also as a "name service client."

In one aspect of the invention, a computer-based method of performing automated distribution of a software package to one or more target machines in one or more regions of a distributed network of target machines is provided. The method comprises the following steps. First, a base software package is prepared for each of the one or more regions based on at least one of: (i) policy data indicating which of the one or more regions are candidates for receiving the software package, (ii) dependency information indicating requisites for a service provided by the software package, and (iii) configuration information for each of the candidate regions. The base software package is then distributed to each of the candidate regions of the distributed network. Next, the base software package received at each of the candidate regions is customized based on at least one of: (i) regional distribution policies, (ii) dependency information specific to one or more roles performed by the target machines in that region, and (iii) individual target machine configuration information. Lastly, the software package customized in each of the candidate regions is distributed to at least one of the target machines in the candidate regions of the distributed network.

In another aspect of the invention, an automated software package distribution methodology of the invention may be implemented in a three-tier system such that the decision process that determines which targets will receive a new software package is distributed across the system. A service distribution server, one or more region servers, and one or more target machines comprise the three-tier system. Preparation and distribution of the base software package is performed in accordance with the service distribution server. Customization of the base software package and distribution of the customized software package is performed in accordance with the region servers. The target machines then receive customized software packages.

As will become further evident from the detailed description to follow, the fully automated software preparation and distribution methodologies of the invention provide many advantageous features. For example, the invention provides a methodology by which an individual user in an enterprise can force installation of a software package by installing the package locally and bypassing the automatic system. The invention provides a methodology for staged distribution to minimize network bandwidth requirements and the adverse effect of single point of failure. The invention provides a methodology to allow decentralized decision making for software distribution with the following features: (i) periodic updateability, (ii) accurate information (dynamic information) kept close to resources, and (iii) generic information kept at a service distribution server or region servers. The invention also provides a methodology for maintaining inventory, i.e., a region server can choose to maintain (in addition to a role repository) the inventory of all the targets in its region in a database or to determine target resources at runtime. Further, the invention provides a methodology for selecting relevant targets for software distribution, i.e., only correct targets receive software delivered, thus minimizing wasted transmission. Still further, the invention provides a methodology for distributing only the required set of software packages, i.e., only necessary packages get delivered (if a specific region does not provide a service and an "override" flag is not set, then the package will not be delivered to region server). This feature saves bandwidth and system resources. In addition, the invention allows a better and more scaleable distribution of knowledge regarding enterprise wide (top-down) policies and individual (bottom-up) system requirements.

These and other objects, features and advantages of the present invention will become apparent from the following detailed description of illustrative embodiments thereof, which is to be read in connection with the accompanying drawings.

DETAILED DESCRIPTION OF THE EMBODIMENTS

The present invention will be explained below in the context of an illustrative software distribution system in a client/server environment. However, it is to be understood that the present invention is not limited to such a distributed computing environment. Rather, the invention is more generally applicable to any computing environment with individual computing devices in which it is desirable to provide automatic software distribution based on the role and the service associated with a software package rather than relying upon an administrator (as in the conventional push-based approach) or a user of the target machine (as in the conventional pull-based approach) to determine whether the target machine needs to be updated.

Figure 2:
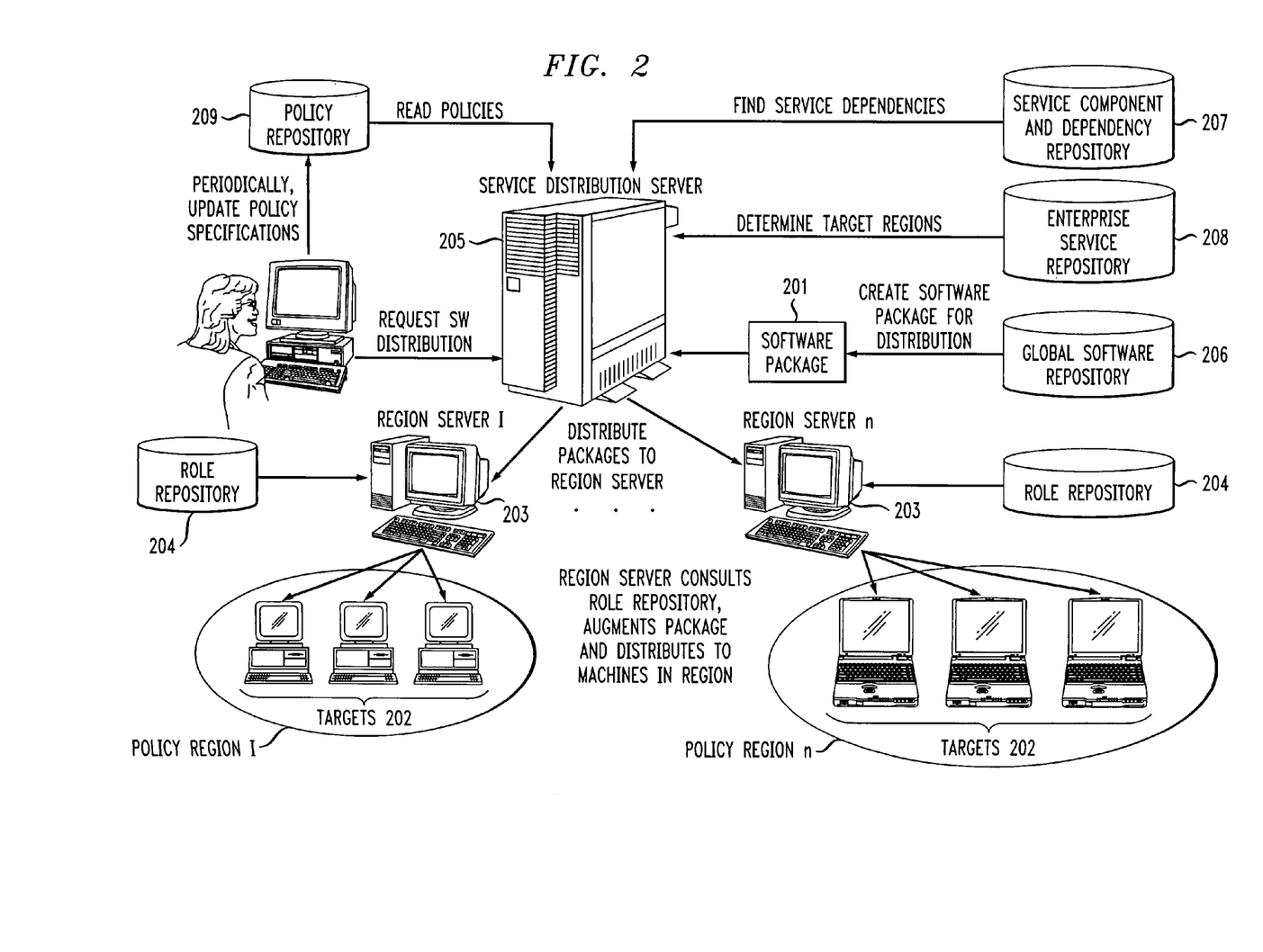
FIG. 2 is a block diagram illustrating a system for constructing and distributing a software package according to an embodiment of the invention.

Referring now to FIG. 2, a block diagram illustrates a system for constructing and distributing a software package according to an embodiment of the invention. We begin with a description of the various components and concepts of the software package construction and distribution system of the present invention in accordance with FIG. 2.

A software package 201 is a unit of physical containment for a collection of software components forming a service or an end-user application.

Software distribution is the task of deploying and shipping a package to a target. This task also involves the determination of appropriate targets.

A distribution target 202 is a computer system providing services to end users and/or other computer systems. The target is able to receive and install a package. A target system is a member of a region and it interacts with the region server, which maintains configuration information. As shown in FIG. 2, there may be a number of policy regions I, . . . , n, each of which may include one or more distribution targets.

A region server 203 maintains the region role repository 204 for one region (every region has a region server), answers queries of a service distribution server 205, determines whether targets have appropriate resources (either by querying them on demand or by maintaining a database with their configuration settings), distributes software to targets and initiates their installation and post-installation steps (e.g., reboot of target) if these are not covered by a package installation routine.

A role repository 204 contains an entry for each machine in its domain or region. An illustrative entry is as follows:

| Service | Role | Package | Updateable (yes/no) |
|---|---|---|---|
| Database | Server | DB2 UDB 5.2 | no |
| Web | Server | Apache 1.3.4 | yes |
| Web | Client | Netscape 4.72 | yes |
| Web | Client | MS Internet Explorer 5 | yes |
| Word Processing | Standalone | Microsoft Word 2000 | yes |

Examples and Explanation of the Above Table Fields:

The "service" names: e.g., web, database, web application.

The "role" names: e.g., client, server, standalone (the latter stands for a typical isolated PC application, such as word processing, spreadsheet, etc.).

The associated software "packages" (i.e., the product name) that are installed and enable the target to act in the specified role(s).

"Updateable" flag: this allows a user to prevent the updating of an installed package, e.g., when a legacy version of a word processor must be used and must not be updated.

A service distribution server 205 is the entity that is responsible for coordinating the distribution process once the system has decided that a new software/service item needs to be distributed. The complete process that the server goes through is explained below in the detailed description of the algorithm, but in short, it does the following: (i) consults policy database 209 before every installation; (ii) determines appropriate region servers for distributing software package; (iii) distributes package to region server; (iv) interacts with region server; and (v) maintains enterprise service repository 208 and policy database 209.

A global software repository 206 is used as follows. Once a new software package and its description are received, the package is stored in this archive and is then available for distribution. The description relating to the dependencies is read and inserted in an enterprise service dependency portion of a repository 207 while the software package's component structure is recorded in a service component portion of the repository 207. The service distribution server periodically accesses the global software repository 206 for new software (or gets notified if new packages are available), extracts packages and distributes them to region servers.

Figure 3:
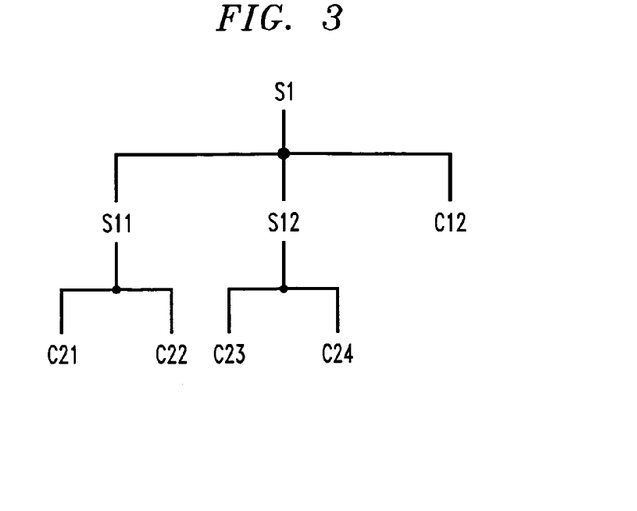
FIG. 3 is a diagram illustrating a service containment tree for use according to the invention.

A service component and dependency repository 207 consists of the following two logical repositories:

Enterprise Service Dependency Repository:

As new services are defined and deployed, their dependency relationships with other services are recorded in this repository. FIG. 3 provides an example. This information structure enumerates, for each deployed service, all the constituent services and software components. Generally, S refers to a service comprising one or more software components, while C refers to a software component which constitutes a service. Thus, as shown in FIG. 3, service S1 is composed of services S11 and S12 and software component C12. If, for example, a new version of a software component C21 or C22 is available, all end point machines that are involved with services S11 and S1, are potential targets for receiving a new copy of this software. The same is true for S12 and S1 with respect to C23 and C24.

Figure 4:
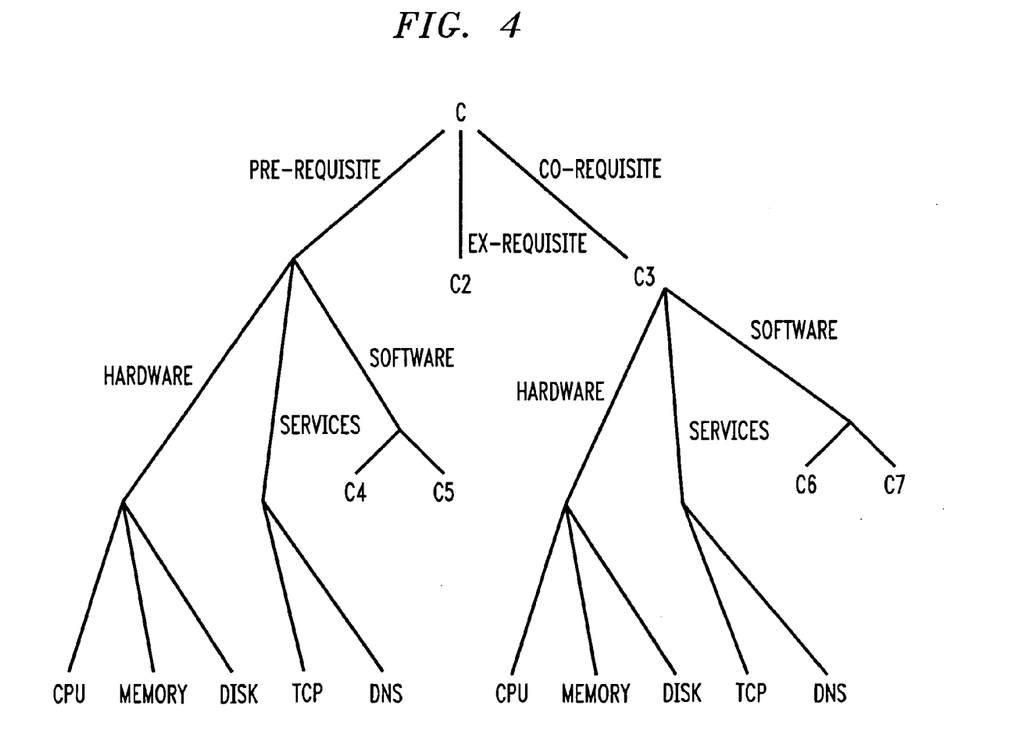
FIG. 4 is a diagram illustrating a dependency tree with services and subcomponents for use according to the invention.

Component Dependency Repository:

This repository records dependency information about software items that form individual distributable units. Each such item has specific hardware and software requirements, which are classified into pre-requisite, co-requisite and ex-requisite groups, as shown in FIG. 4. When available, the physical containment structure (i.e., the components) of a service is extracted and stored here. Consider the following example: A word processor with (optional) parts such as graphics import filters is recorded here and not in the enterprise dependency repository portion because service components only exist within the scope of a service. Defining resource requirements for a graphics import filter does not make sense, while specifying them for a word processor does make sense.

The component dependency repository includes the dependency information hierarchy for all elements in the global package repository 206.

Associated with a package are descriptions of sub-packages, the services they provide, whether they are pre-requisites or co-requisites, the platform requirements, etc.

As shown in FIG. 4, component C (root) has various categories of dependencies that include hardware (e.g., CPU, Memory, Disk), software (e.g., C4 and C5) and service elements (e.g., Transmission Control Protocol (TCP), Domain Name Service (DNS)). Pre-requisites (as shown on the leftmost branch extending from C) are items that need to be present, i.e., already installed within the environment before the component in question can be installed successfully. For example, "TCP/IP version 2.3 is a pre-requisite for component DNS client." Ex-requisites (center branch including C2) are items that should not be present in order for the component to be installed successfully. For example, "wireless LAN card driver software" may be an ex-requisite for installing "infrared driver component software." Co-requisite (optional) dependencies (as shown on the rightmost branch extending from C and C3) are elements that may, for example, increase the performance/usability of the service. Examples of co-requisites are graphics import filters for a word processor.

An enterprise service repository 208 contains for every region: (i) the services a region provides: determined by querying, for every service, whether an appropriate server is located within the region; and (ii) the services that are available in a region (i.e., the services consumed by the targets inside a region): determined by downloading the service/client pairs from the region server.

Also, communication services (network connectivity, name service, etc.) are listed in this repository. An example of such is as follows:

| Region | Service | Role |
| --- | --- | --- |
| Accounting Department | Web | Client |
| Accounting Department | Database | Server |
| Marketing Department | Word Processing | Standalone |
| Marketing Department | Web | Client |

A service profile is the set of services a region offers to its users; i.e., either in client, server or standalone role. A service profile for a specific region is equivalent to the entries of the enterprise service repository for a given region. Note that there are usually multiple entries for a given region.

A policy repository 209 is used as follows. Software distribution policies are entered periodically by the software distribution administrator in the policy database 209. Examples of policy rules are: "every capable system acting in appropriate role should receive the new package;" "client software can only be installed if appropriate server is available (determined from enterprise service repository 208);" "software package will only be installed on a specific target if service is either flagged as updateable;" or, if not yet present on the target, the "override" flag is set; "software updates should only occur between 11 PM and 6 AM;" "Region I should not get any updates because of non-payment;" "a software package is distributed to region servers if their region fits the distribution profile;" ("server"

has precedence over "client," i.e., if a server for a given service is present in a region, client software can always be installed, but not the reverse) etc.

Some general rules regarding the illustrative system may include the following. Software on a node is only updated if an identical package is already present on the system. This is necessary to prevent the occurrence where a target using Microsoft™ Word 2000 as a word processor also receives Lotus™ Word Pro 7 (just because their region is listed as having subscribed to the word processing service).

If new software has to be installed, the software administrator can force this installation by using the "override" flag. However, the "override" flag has lower precedence compared to the "updateable" flag that is defined on a specific target. This is used to prevent updates of software packages that must remain at a previous version (e.g., for compatibility issues).

Given the description of the components and concepts of an illustrative software package construction and distribution system of the invention, as shown in FIG. 2, a detailed description of a software distribution process according to an illustrative embodiment of the invention will now follow. The software distribution algorithm comprises two phases: basic package preparation for distribution to the region servers, as generally shown in FIG. 5A; and preparation and distribution of a package within each region, as generally shown in FIG. 5B.

Figure 5A:
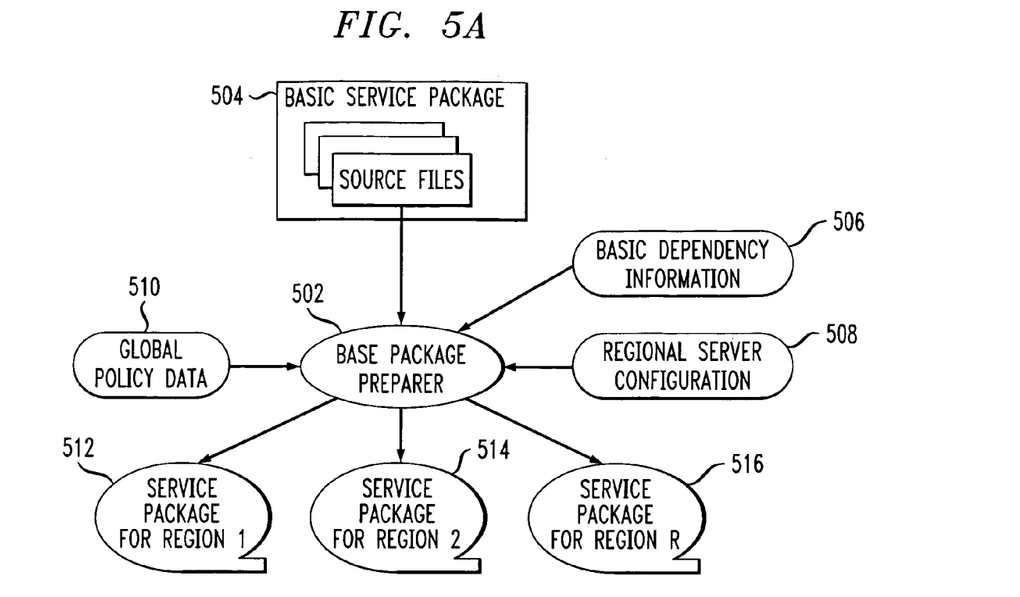
FIG. 5A is a diagram illustrating base package preparation for individual region servers or groups of similar servers according to an embodiment of the invention.

Referring initially to FIG. 5A, the basic service (software) package 504 is the component that is a candidate for installation in the appropriate target machines. The base package preparer operation 502 receives as input the global policy data 510 indicating which regions are candidates for upgrade, the basic dependency information 506 indicating the pre-requisites, ex-requisites and co-requisites for the service package, and the configuration information 508 for each of the regional servers representing the candidate regions. Using this information, the base package preparer operation 502 constructs a base service package for each of the regions 512, 514 and 516.

Figure 5B:
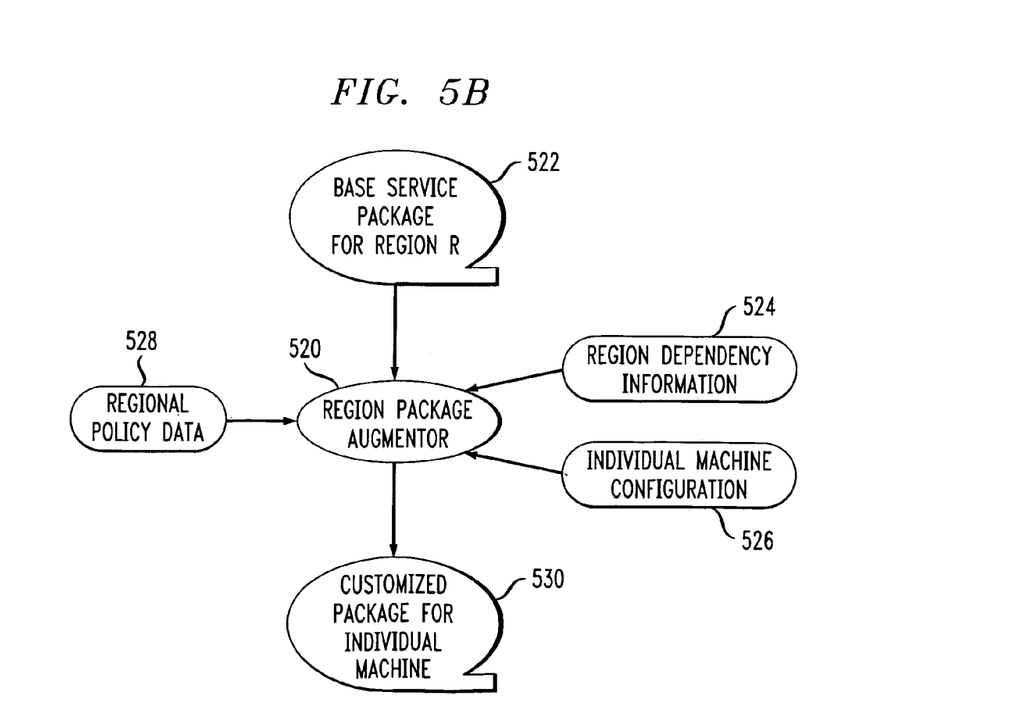
FIG. 5B is a diagram illustrating preparation and distribution of a software package within individual regions according to an embodiment of the invention.

Referring now to FIG. 5B, when a region server, responsible for distributing a package to each of the end points within its domain, receives a base service package 522, it needs to augment it with specific dependency items that are needed by the individual machines within the region. This is done by a region package augmentor operation 520, which receives as input the regional distribution policies 528, the dependency information 524 specific to the machines in that region, and individual machine configuration information 526 that will be used to customize the base package for each of the target machines. The output is a set of customized packages 530 that is produced for each group of machines within the region, having the same installation environment.

FIGS. 6 through 12, which provide illustrative details of the software distribution process, will now be explained.

Figure 6:
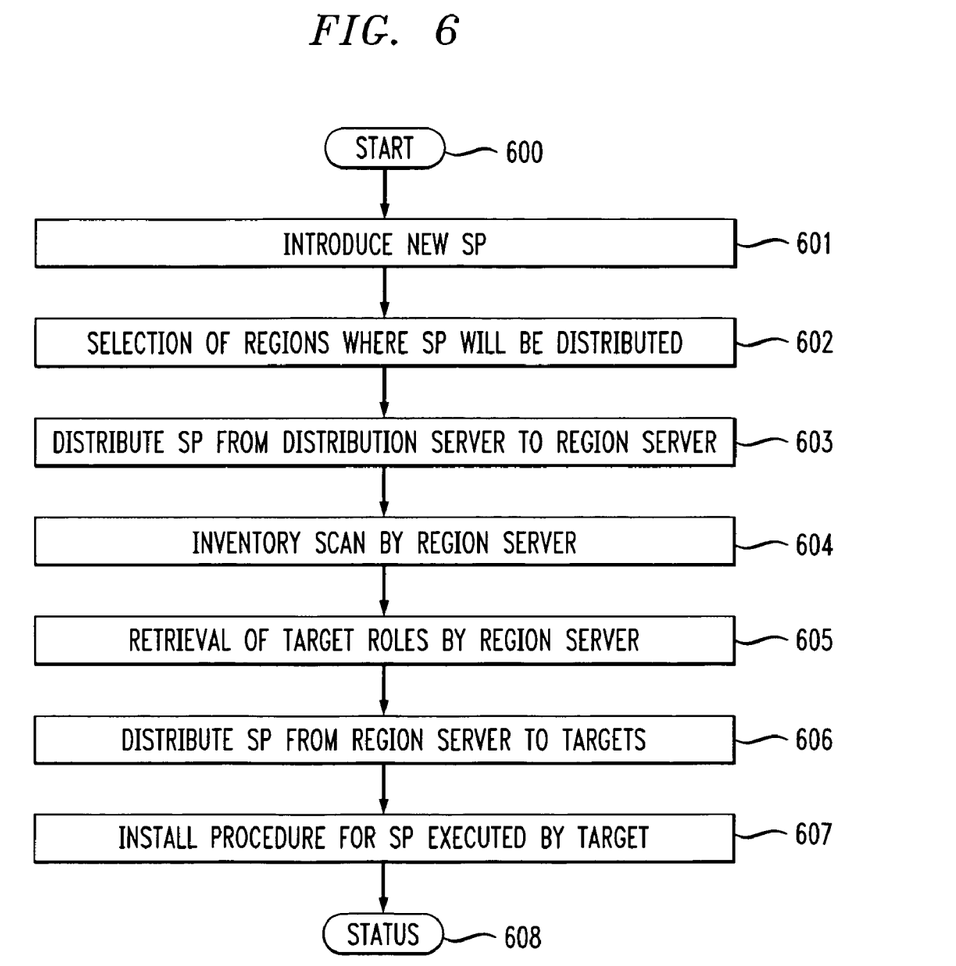
FIG. 6 is a flow diagram illustrating steps of a software distribution algorithm according to an embodiment of the present invention.

Referring now to FIG. 6, a flow diagram illustrates steps of a software distribution algorithm according to an embodiment of the present invention. The algorithm begins at block 600 and proceeds as follows.

Step 601: Introduce new software package (SP). A new SP (201 in FIG. 2) and its description (e.g., service, role, software name, version, resource pre-requisite list, service pre-requisite list) is entered in the service distribution server or SDS (205 in FIG. 2) and stored in the global software repository (206 in FIG. 2). The step of introducing the new SP may also be done by another application that stores the package and its description in the service component and dependency repository (207 in FIG. 2) and notifies the SDS that a new SP for a given service and a given role is available. If not already done, the service provided by the package is entered in the service component and dependency repository (207 in FIG. 2). This repository stores a directed, acyclic service dependency graph that allows the system to determine whether and how a new service fits in the dependency structure and, specifically, what services will be affected by the introduction of this new package.

Step 602: Selection of target regions. This step is performed by the SDS (205 in FIG. 2) to determine all the region servers (203 in FIG. 2) whose service profiles match the service that is going to be provided by the new package (i.e., the region provides/consumes the service in question). If a particular region is a subscriber to this service (either as a client or as a server), it is added to the set of potential targets for distribution. Next, for each region in this set, the SDS consults the policy repository (209 in FIG. 2) to ensure that each target region is indeed a potential candidate. If not, the region is removed from the target set.

Step 603: Software distribution from SDS (205 in FIG. 2) to region server (203 in FIG. 2). An administrator can override settings by flagging a software install request as "override" (needed for installation of a new service that is not yet present in the region). For each region in the target set (computed in step 602), the SDS prepares a package, based on dependency requirements, that is suitable for target machines in that region. This package is then transported to the region. Typical message content may include: service name, package name, "override" flag, package binary.

Step 604: Region server (203 in FIG. 2) performs inventory scan. After receiving a package, the region server (RS) determines if each of the end point machines (the potential targets) has an appropriate amount of resources (CPU, RAM, disk space, swap space, etc.). Additional checks performed are: (i) determine if a target (202 in FIG. 2) has an appropriate version of the (correct) operating system; and (ii) determine if target has appropriate pre-requisites (i.e., are the required services present). Note that the dependency repository (207 in FIG. 2) is maintained at the SDS level, because when a SP is updated or newly created, the dependency information is created at that time and can be stored centrally.

Step 605: Retrieval of target roles (performed by RS). As mentioned earlier, the RS (203 in FIG. 2) maintains a role repository (204 in FIG. 2) for each target machine (202 in FIG. 2) within its domain. This information in this repository is extracted either periodically with storage of results in the role repository, or dynamically (on demand). For every target, information may consist of: service, role, associated software package(s), and updateable flag.

Step 606: Software distribution from RS (203 in FIG. 2) to targets (202 in FIG. 2). For each end point machine within a domain, the RS performs an inventory scan to determine the environment of the machine. If the result satisfies the dependency requirements of the SP, the end machine is a potential target. Distribution to this target is initiated only if: flag is set to updateable (i.e., not explicitly forbidden by target user) or install request is flagged as "override" (i.e., forced by software distribution administrator). Message content may include: service name, package name, "override" flag, package binary.

Step 607: Result of software distribution from RS (203 in FIG. 2) to targets (202 in FIG. 2). In this step, the results of the distribution step are gathered, installation on targets launched, post installation procedures and tests are done. Installation results are gathered at region server.

Step 608: Status update from RS (203 in FIG. 2) to SDS (205 in FIG. 2). The RS sends status of the distribution step to the SDS, and the algorithm ends.

Figure 7:
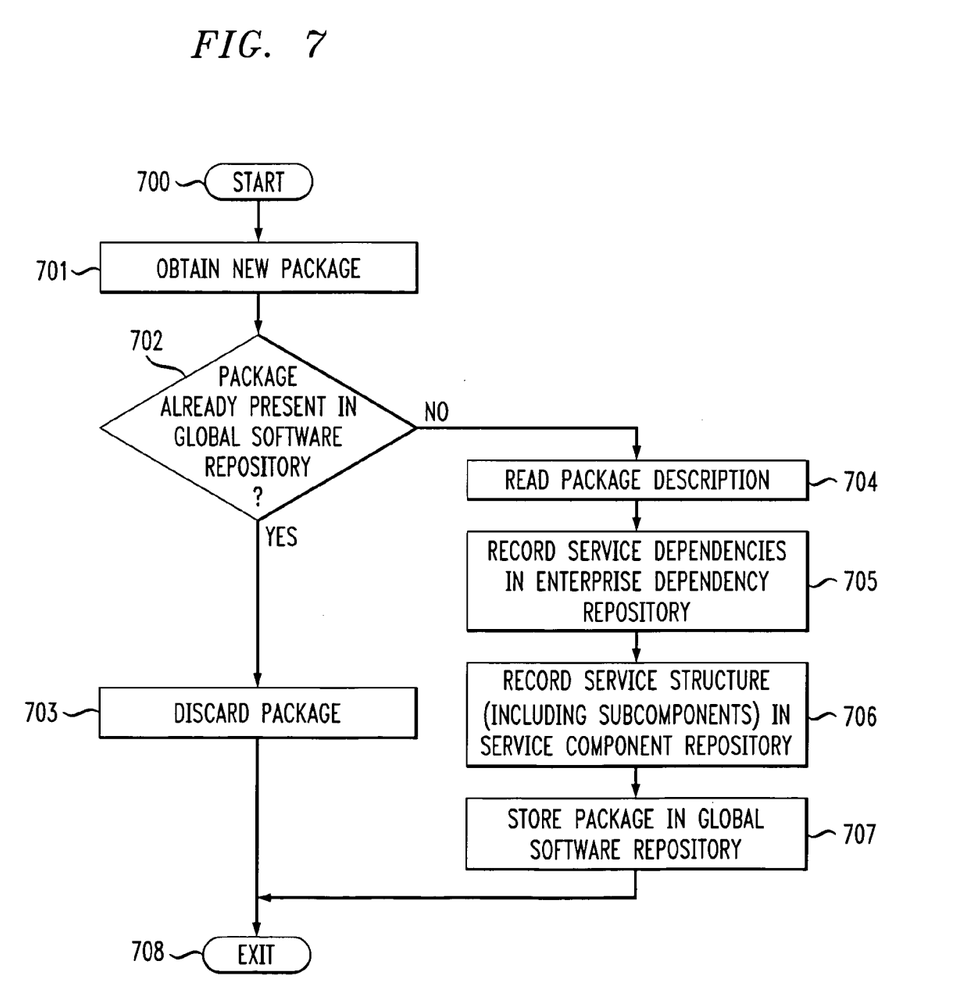
FIG. 7 is a flow diagram illustrating steps of a package reception and information extraction algorithm according to an embodiment of the present invention.

Referring now to FIG. 7, a flow diagram illustrates steps of a package reception and information extraction algorithm according to an embodiment of the present invention. The algorithm begins at block 700 and proceeds as follows.

Step 701: Obtain new package. This step represents the arrival of a new software package (201 in FIG. 2) that is a candidate for distribution. The arrival of the package can be indicated manually by an administrator or automatically by a process running in the SDS (205 in FIG. 2), which periodically checks the status of the global software repository (206 in FIG. 2) where packages are stored. The step can be done either by the operator placing the software package file(s) in an upload area being periodically checked or by using a command line interface (push-based approach). Alternatively, the responsible component can query some predefined software servers for updates and download them on its own.

Step 702: Determine if software package is already present in the global software repository. That is, the system checks whether this is a new package.

Step 703: Discard package. If it is determined that the software package is already present and therefore is not new, then it is discarded and the algorithm is exited (block 708).

Step 704: Read package description. If it is determined that the software package is not already present and therefore is new, then step 705 is executed. Each package is assumed to be accompanied by information listing the service, software and hardware dependencies of the package. This information is read by the SDS (205 in FIG. 2).

Step 705: Record service dependencies. The information read in step 704 is recorded in the proper data structure within the service component and dependency repository (207 in FIG. 2).

Step 706: Record service structure. Relevant information related to the relationship of this package to existing services is recorded in the service component and dependency repository (207 in FIG. 2).

Step 707: Store package. The package is stored in the global software repository (206 in FIG. 2).

Step 708: Exit algorithm. Exit from algorithm with proper exit code.

Figure 8:
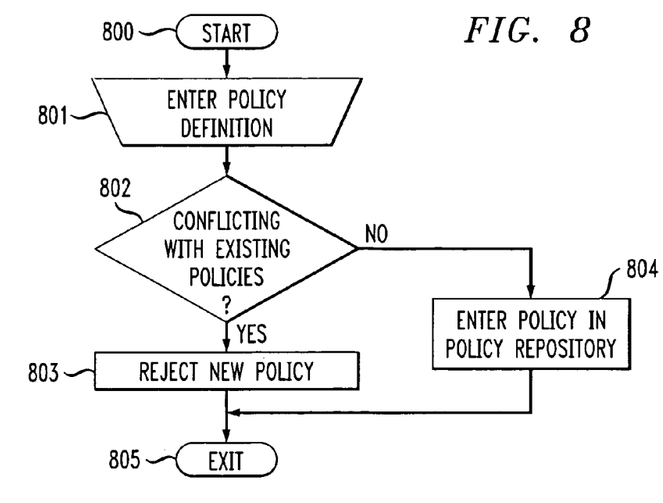
FIG. 8 is a flow diagram illustrating steps of a policy repository extension algorithm according to an embodiment of the present invention.

Referring now to FIG. 8, a flow diagram illustrates steps of a policy repository extension algorithm according to an embodiment of the present invention. The algorithm begins at block 800 and proceeds as follows. This process deals with the population of the policy repository (209 in FIG. 2). When a new policy dealing with the conditions under which a particular region can or cannot be considered as a target for software distribution is formulated, this process performs the steps by which such a policy is entered in to the policy repository. If, after obtaining a new policy definition (step 801), a conflict is detected with existing policies (step 802), the new policy is rejected (step 803). If not, the new policy is entered (step 804) into the policy repository. The process ends at block 805. Note that the criteria for rejection could be more complex, based on the nature of the enterprise where the software distribution is being implemented. This illustrative description does not address policy conflict resolution issues. Instead, it assumes that a process is in place to maintain the policy repository in a consistent state. Therefore, it is to be understood that any appropriate policy conflict resolution mechanism may be employed.

Figure 9:
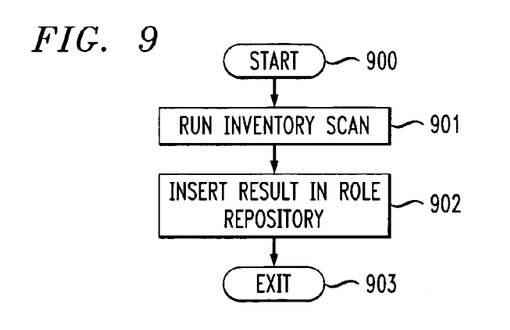
FIG. 9 is a flow diagram illustrating steps of a role repository maintenance algorithm according to an embodiment of the present invention.

Referring now to FIG. 9, a flow diagram illustrates steps of a role repository maintenance algorithm according to an embodiment of the present invention. The algorithm begins at block 900 and proceeds as follows. This algorithm is implemented by a region server (203 in FIG. 2) and is executed for each machine that is a member of the region server's domain. The region server executes a scan (step 901) of the individual machine repositories and derives from this information the data that is required to populate the role repository that it maintains. Thus, the inventory scan checks the individual system repositories and returns the following data: service, role, package, updateable flag. The latter is particularly important because it allows an individual user to block the automated update of his target. The results of the scan are then inserted in the role repository (step 902). The algorithm ends at block 903.

Figure 10:
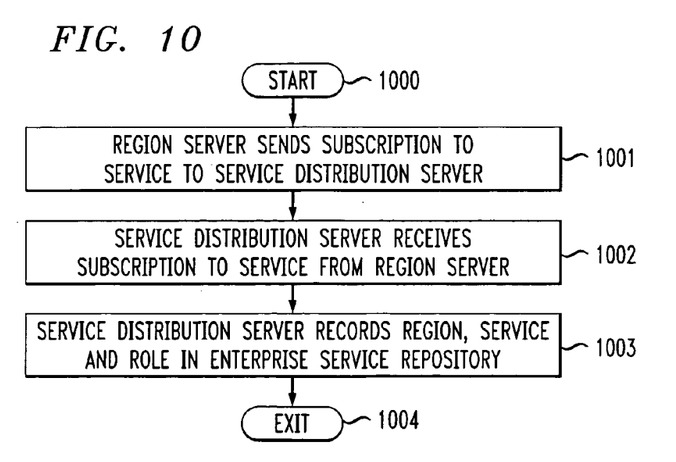
FIG. 10 is a flow diagram illustrating steps of a region subscription algorithm according to an embodiment of the present invention.

Referring now to FIG. 10, a flow diagram illustrates steps of a region subscription algorithm according to an embodiment of the present invention. The algorithm begins at block 1000 and proceeds as follows. The region subscription algorithm is the realization of a protocol between the region servers and the SDS, through which the SDS is able to learn and record all the services that a region is interested in, on behalf of its constituent members.

When an end machine within a region wishes to participate as a client or server in a new service, the region server communicates this information (in a formalized protocol) to the SDS (step 1001). The SDS receives the subscription information from the region server (step 1002) and records (step 1003) this information in the enterprise service repository (208 in FIG. 2). The algorithm ends at block 1004.

Figure 11:
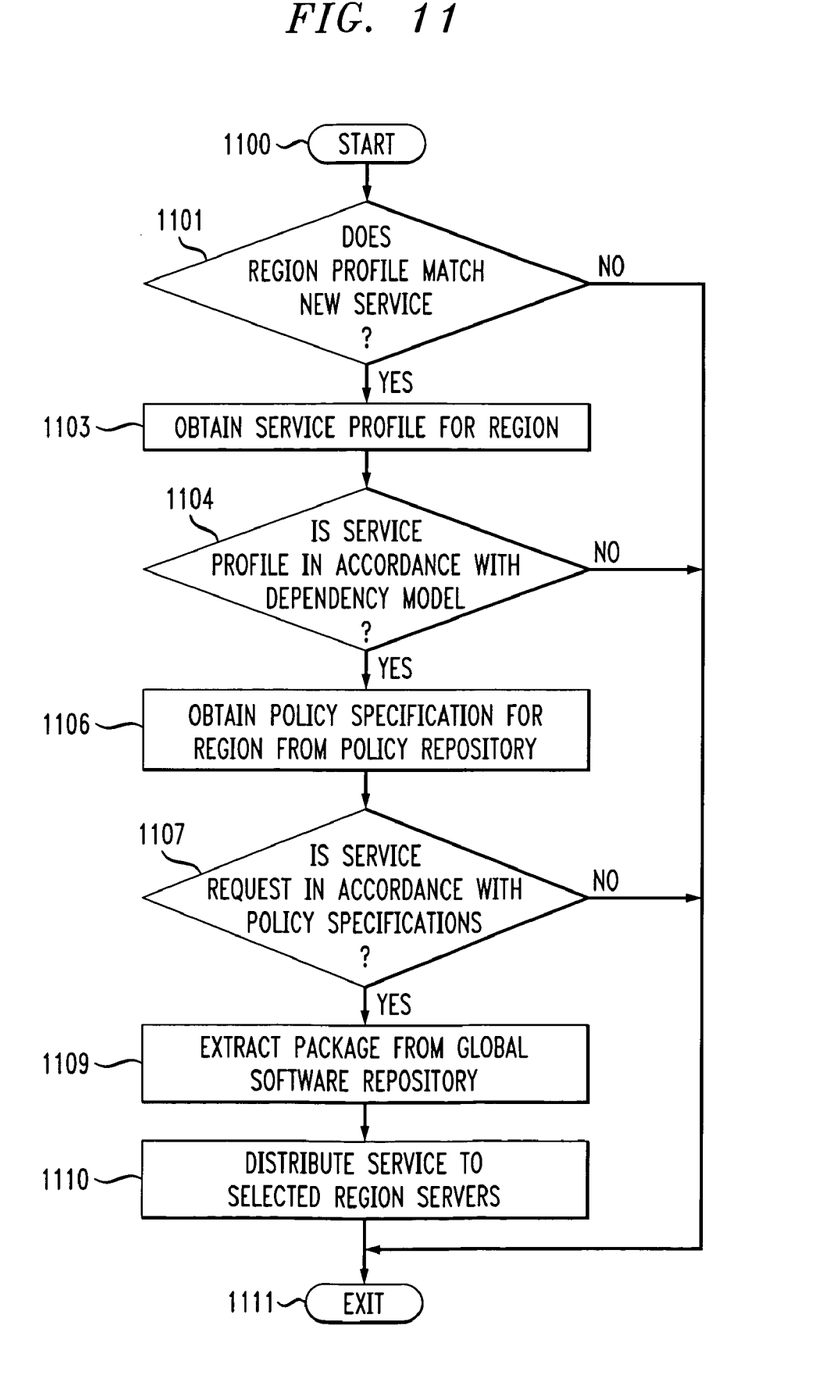
FIG. 11 is a flow diagram illustrating steps of a service distribution algorithm according to an embodiment of the present invention.

Referring now to FIG. 11, a flow diagram illustrates steps of a service distribution algorithm according to an embodiment of the present invention. This algorithm is executed by the SDS to determine which regions qualify as targets for software distribution and what needs to be done to prepare a distribution package for the regions that qualify.

The process begins at block 1100. Once a new software package has been accepted by the SDS as a potential distribution item, the SDS consults the enterprise service repository (208 in FIG. 2) to determine whether a given region is affected by the new item (step 1101). That is, a determination is made as to whether the region matches the new service. Note that the enterprise service repository maintains a table depicting the services to which each region subscribes. If a particular region is not involved with a service, then the algorithm exits (block 1111). If the region is involved, SDS checks to see that the region satisfies the basic dependency requirements (e.g., if this software change is only valid for Windows 95 machines and the region has only UNIX machines, then even though the region subscribes to the basic service, it is not a candidate for distribution). This is accomplished in accordance with steps 1103 and 1104. That is, in step 1103, the SDS obtains the service profile for the particular region. Then, in step 1104, the SDS determines whether the service profile is in accordance with the dependency model. If it is not, then the algorithm exits (block 1111). If yes, the SDS next checks the policy repository to determine that the region in question does not have an associated policy that eliminates it from consideration (e.g., there might be a policy which says that if a license has expired, do not distribute). This is accomplished in accordance with steps 1106 and 1107. That is, in step 1106, the SDS obtains the policy specification for the particular region from the policy repository. Then, in step 1107, the SDS determines whether the service request is in accordance with the policy specification. If it is not, then the algorithm exits (block 1111). If yes, at this point, a particular region has successfully passed all the checks and is a candidate for receiving the new software package. The SDS then extracts the package from the global software repository (step 1109) and distributes the package to the region (step 1110). The algorithm ends at block 1111.

Figure 12:
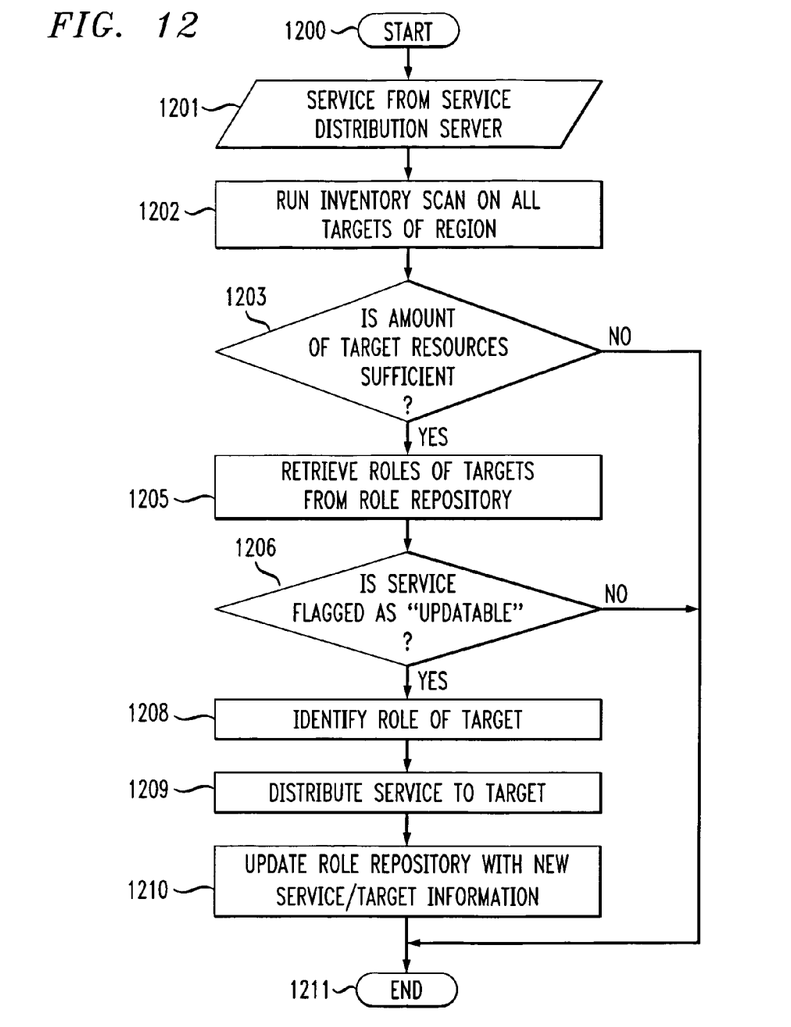
FIG. 12 is a flow diagram illustrating steps of a region server algorithm according to an embodiment of the present invention.

Referring now to FIG. 12, a flow diagram illustrates steps of a region server algorithm according to an embodiment of the present invention. The process begins at block 1200. In step 1201, the region server receives the package or service from the SDS. Once a region server has received a package for distribution from the SDS, it starts an algorithm to determine which of the end points or machines in its domain qualify to receive the new software package. The first step is to run an inventory check on each of the domain members to obtain their environment (step 1202). This information is then checked with the critical dependency or resource requirements of the new package (step 1203). For example, the resources may include CPU, RAM, disk space, swap space, operating system (type and version), etc. It is to be appreciated that the operating system check has to be done at the region level because the SDS is unaware of operating system details. If the resource requirements are satisfied, then the role information for this machine is extracted from the role repository (step 1205). If not the algorithm exits (block 1211). It is to be understood that the role repository is a conceptual repository, i.e., it can either be realized as a storage entity or its information can be determined at runtime by querying the individual targets.

In step 1206, the region server determines whether this service is marked as updateable and what role (e.g., client, server, standalone) the machine plays in the context of this updated service. Note that even though a target machine may qualify for an update, the user may not want such an update for various reasons. The update flag is a mechanism available to the user to stop an update. If service is not flagged as "updateable," then the particular target machine is removed from consideration and the algorithm exits (block 1211). Next, in step 1208, the role of the target is identified (e.g., client, server, standalone). Finally, in step 1209, the package is distributed to the target machine and, based on the changes, the role information for this machine is updated in the role repository with the new service/target information (step 1210). This yields incremental updates of the role repository, thus eliminating the need to run inventory scans every time. The algorithm ends at block 1211.

Figure 13:
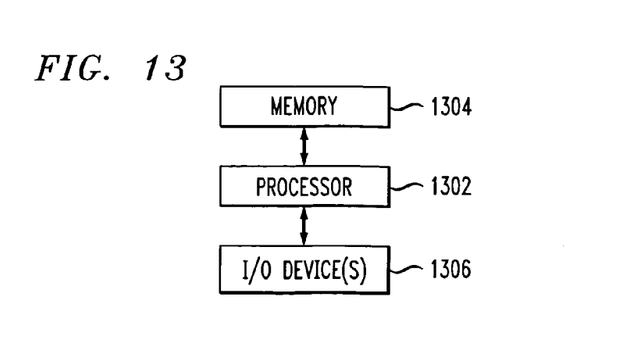
FIG. 13 is a block diagram illustrating a generalized hardware architecture of a computer system suitable for implementing the various functional components/modules of a software construction and distribution system according to an embodiment of the present invention.

Referring now to FIG. 13, a block diagram is shown illustrating a generalized hardware architecture of a computer system suitable for implementing the various functional components/modules of a software construction and distribution system as depicted in FIG. 2 and explained in detail herein. It is to be understood that the individual components of the system, namely, the service distribution server, the region servers, the targets and the various repositories may be respectively implemented on one such computer system, or on more than one such computer system. Also, two or more components of the system may be implemented on one or more such computer systems.

It is also to be understood that the computer systems that implement the various components of the system are coupled via a communication network (not shown) to form the distributed computing environment. The communication network may be public (e.g., Internet) and/or private. The network may be a wide area network and/or a local area network. The type of network is not critical to the invention.

As shown in FIG. 13, the computer system may be implemented in accordance with a processor 1302, memory 1304 and I/O devices 1306. It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices, e.g., keyboard, mouse, etc., for entering data to the processing unit, and/or one or more output devices, e.g., CRT display, printer, etc., for presenting results associated with the processing unit. It is also to be understood that the term "processor" may refer to more than one processing device and that various elements associated with a processing device may be shared by other processing devices. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. In any case, it should be understood that the elements illustrated in FIG. 2, as well as the structures and steps illustrated in FIGS. 3 through 12, may be implemented in various forms of hardware, software, or combinations thereof, e.g., one or more appropriately programmed general purpose digital computers with associated memory. Given the teachings of the invention provided herein, one of ordinary skill in the related art will be able to contemplate other implementations of the elements of the invention.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer-based method of performing automated distribution of a software package to one or more target machines in one more regions of a distributed network of target machines, the method comprising the steps of:

preparing a base software package for each of the one or more regions, wherein the software package preparation is based on: (I) policy data indicating which of the one or more regions are candidates for receiving the software package, (ii) dependency information indicating requisites for a service provided by the software package comprising at least one of a pre-requisite, an ex-requisite and a co-requisite associated with installation of the software package on a target machine, and (iii) configuration information for each of the candidate regions;

distributing the base software package to each of the candidate regions of the distributed network;

customizing the base software package received at each of the candidate regions, wherein the software package customization is based on (I) regional distribution policies, (ii) dependency information specific to one or more roles performed by the target machines in that region, and (iii) individual target machine configuration information; and distributing the software package customized in each of the candidate regions to at least one of the target machines in the candidate regions of the distributed network.

2. The method of claim 1, wherein the dependency information indicating requisites for a service provided by the software package is represented in the form of a multi-level tree.

3. The method of claim 2, wherein one or more leaves of the tree represent one or more software components.

4. The method of claim 1, wherein the one or more roles performed by the target machines in a region comprise a client role, a server role and a standalone role.

5. The method of claim 1, further comprising the step of also permitting manual control over the installation of the software package on a target machine.

6. The method of claim 5, wherein manual control over the installation of the software package on a target machine is effectuated by setting a flag.

7. The method of claim 1, further comprising the step of maintaining a policy repository indicating steps needed to construct distributable component packages for different regions and different end user environments.

8. The method of claim 1, wherein the individual target machine configuration information used to customize the base software package received at a candidate region is one of stored prior to use and determined at the time of use.

9. A system for performing automated distribution of a software package to one or more target machines in one or more regions of a distributed network of target machines, the system comprising:
  a service distribution server, the service distribution server being operative to: (i) prepare a base software package for each of the one or more regions, wherein the software package preparation is based on policy data indicating which of the one or more regions are candidates for receiving the software package, dependency information indicating requisites for a service provided by the software package comprising at least one of a pre-requisite, an ex-requisite and a co-requisite associated with installation of the software package on a target machine, and configuration information for each of the candidate regions; and (ii) distribute the base software package to each of the candidate regions of the distributed network; and
  one or more region servers, each of the region servers being operative to: (i) customize the base software package, when received, wherein the software package customization is based on regional distribution policies, dependency information specific to one or more roles performed by the target machines in the region of the region server, and individual target machine configuration information; and (ii) distribute the customized software package to at least one of the target machines in the region of the region server.

10. The system of claim 9, wherein the dependency information indicating requisites for a service provided by the software package is represented in the form of a multi-level tree.

11. The system of claim 10, wherein one or more leaves of the tree represent one or more software components.

12. The system of claim 9, wherein the one or more roles performed by the target machines in a region comprise a client role, a server role and a standalone role.

13. The system of claim 9, wherein the installation of the software package on a target machine may also be manually controlled.

14. The system of claim 13, wherein manual control over the installation of the software package on a target machine is effectuated by setting a flag.

15. The system of claim 9, further comprising a policy repository for indicating steps needed to construct distributable component packages for different regions and different end user environments.

16. The system of claim 9, wherein each region server is further operative to one of maintain the individual target machine configuration information used to customize the base software package prior to use and determine the information at the time of use.

17. The system of claim 9, further comprising one or mare repositories for storing the policy data indicating which of the one or more regions are candidates for receiving the software package, the dependency information indicating requisites for a service provided by the software package, and the configuration information for each of the candidate regions.

18. The system of claim 9, further comprising one or more repositories for storing the regional distribution policies, the dependency information specific to one or more roles performed by the target machines in the region of the region server, and the individual target machine configuration information.

19. An article of manufacture for performing automated distribution of a software package, in accordance with a service distribution server, to one or more target machines in one or more regions of a distributed network of target machines, the article comprising a machine readable medium containing one or more programs which when executed implement the steps of:
  preparing a base software package for each of the one or more regions, wherein the software package preparation is based on: (I) policy data indicating which of the one or more regions are candidates for receiving the software package, (ii) dependency information indicating requisites for a service provided by the software package comprising at least one of a pre-requisite, an ex-requisite and a co-requisite associated with installation of the software package on a target machine, and (iii) configuration information for each of the candidate regions; and
  distributing the base software package to each of the candidate regions of the distributed network for subsequent customization of the base software package received at each of the candidate regions, wherein the software package customization is based on regional distribution policies, dependency information specific to one or more roles performed by the target machines in that region, and individual target machine configuration information; and for subsequent distribution of the software package customized in each of the candidate regions to at least one of the target machines in the candidate regions of the distributed network.

20. An article of manufacture for performing automated distribution of a software package, in accordance with a region server, to one or more target machines in a region of a distributed network of target machines having one or more regions, the article comprising a machine readable medium containing one or more programs which when executed implement the steps of:
  obtaining a base software package prepared for the region associated with the region server, wherein the software package preparation is based on policy data indicating which of the one or more regions are candidates for receiving the software package, dependency information indicating requisites for a service provided by the software package comprising at least one of a pre-requisite, an ex-requisite and a co-requisite associated with installation of the software package on a target machine, and configuration information for the region associated wit the region server;
  customizing the obtained base software package, wherein the software package customization is based on regional distribution policies, dependency information specific to one or more roles performed by the target machines in the region associated with the region server, and individual target machine configuration information; and distributing of the customized software package to at least one of the target machines in the region associated with the region server.

* * * * *